(12) United States Patent
Baker

(10) Patent No.: US 9,122,066 B2
(45) Date of Patent: Sep. 1, 2015

(54) STEREO DISPLAY SYSTEMS

(75) Inventor: Henry Harlyn Baker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 13/259,924

(22) PCT Filed: Oct. 30, 2009

(86) PCT No.: PCT/US2009/062850
§ 371 (c)(1),
(2), (4) Date: Sep. 23, 2011

(87) PCT Pub. No.: WO2011/053319
PCT Pub. Date: May 5, 2011

(65) Prior Publication Data
US 2012/0019530 A1    Jan. 26, 2012

(51) Int. Cl.
*G02B 27/22* (2006.01)
*G02B 27/26* (2006.01)
*H04N 13/04* (2006.01)

(52) U.S. Cl.
CPC ........ *G02B 27/2264* (2013.01); *G02B 27/2207* (2013.01); *G02B 27/26* (2013.01); *H04N 13/0431* (2013.01); *H04N 13/0459* (2013.01)

(58) Field of Classification Search
CPC ........... G02B 27/2207; G02B 27/2264; G02B 27/26; H04N 13/0431; H04N 13/0459
USPC ............................................. 345/419; 348/52
See application file for complete search history.

(56) References Cited

U.S. PATENT DOCUMENTS

| | | | |
|---|---|---|---|
| 4,422,720 A * | 12/1983 | Sheiman et al. | 359/472 |
| 5,239,372 A | 8/1993 | Lipton | |
| 6,055,012 A | 4/2000 | Haskell et al. | |
| 6,094,216 A | 7/2000 | Taniguchi et al. | |
| 6,710,920 B1 * | 3/2004 | Mashitani et al. | 359/463 |
| 2001/0043213 A1 * | 11/2001 | Buck et al. | 345/427 |
| 2002/0015007 A1 * | 2/2002 | Perlin et al. | 345/6 |
| 2003/0072483 A1 | 4/2003 | Chen | |

(Continued)

FOREIGN PATENT DOCUMENTS

| CN | 101558655 A | 10/2009 |
|---|---|---|
| EP | 1855247 A1 | 11/2007 |

(Continued)

OTHER PUBLICATIONS

English translation (machine-generated) of Abstract from Japanese Patent Publication No. 2001-339742A.

(Continued)

*Primary Examiner* — Sath V Perungavoor
*Assistant Examiner* — Peter D Le
(74) *Attorney, Agent, or Firm* — Hewlett-Packard Patent Department

(57) ABSTRACT

Various embodiments of the present invention are directed to stereo display systems. In one embodiment, the stereo display system includes a display (402), a viewing area (404), and one or more pairs of stereo projectors (409-411). Each pair of stereo projectors corresponds to a sub-region of the viewing area. In addition, each pair of stereo projectors projects a rectified image pair onto the display so that one or more viewers located in the corresponding sub-region exclusively view the image pair, enabling the viewers in the sub-region to perceive three-dimensional images presented on the display.

15 Claims, 11 Drawing Sheets

(56) References Cited

U.S. PATENT DOCUMENTS

| | | | |
|---|---|---|---|
| 2003/0156260 A1* | 8/2003 | Putilin et al. | 353/10 |
| 2005/0046700 A1* | 3/2005 | Bracke | 348/218.1 |
| 2005/0131924 A1* | 6/2005 | Jones | 707/100 |
| 2006/0087734 A1* | 4/2006 | Weissman | 359/462 |
| 2006/0210145 A1 | 9/2006 | Lee et al. | |
| 2007/0085903 A1* | 4/2007 | Zhang | 348/58 |
| 2007/0165942 A1 | 7/2007 | Jin et al. | |
| 2007/0266412 A1 | 11/2007 | Trowbridge et al. | |
| 2010/0066813 A1* | 3/2010 | Jorke | 348/46 |

FOREIGN PATENT DOCUMENTS

| | | | |
|---|---|---|---|
| EP | 2066133 A1 | 6/2009 | |
| JP | 2001-339742 A | 12/2001 | |
| JP | 2005-175644 A | 6/2005 | |
| JP | 2006-186768 A | 7/2006 | |
| JP | 2008-287120 A | 11/2008 | |
| TW | 200717158 A | 5/2007 | |
| TW | 200826671 A | 6/2008 | |

OTHER PUBLICATIONS

English translation (machine-generated) of Abstract from Japanese Patent Publication No. 2005-175644A.

English translation (machine-generated) of Abstract from Japanese Patent Publication No. 2006-186768A.

English translation (machine-generated) of Abstract from Japanese Patent Publication No. 2008-287120A.

English translation (machine-generated) of Abstract from Taiwan Patent Publication No. 200717158A.

English translation (machine-generated) of Abstract from Taiwan Patent Publication No. 200826671A.

English translation (machine-generated) of Chinese Patent Publication No. 101558655A.

Extended European Search Report, Mar. 19, 2013, European Patent Application No. 09850985.4.

International Search Report, PCT/US2009/062850, Jun. 23, 2010, 11 pages.

* cited by examiner

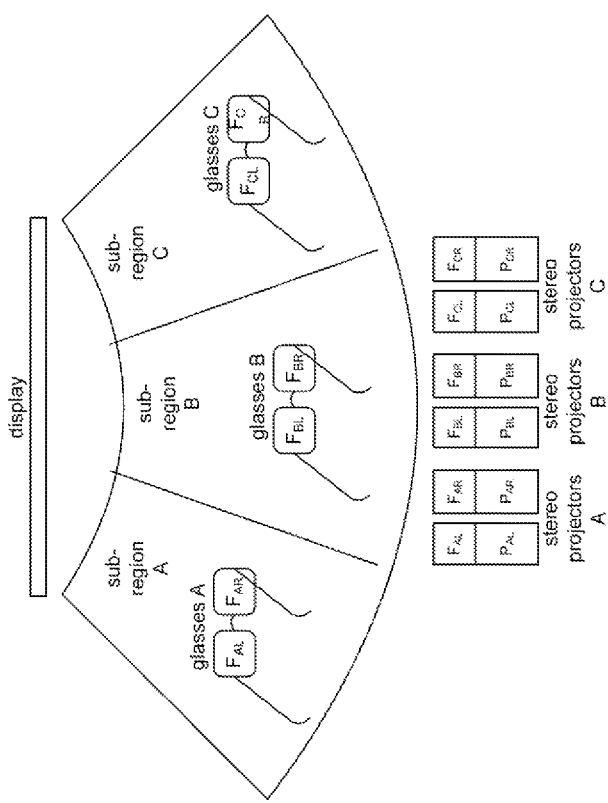
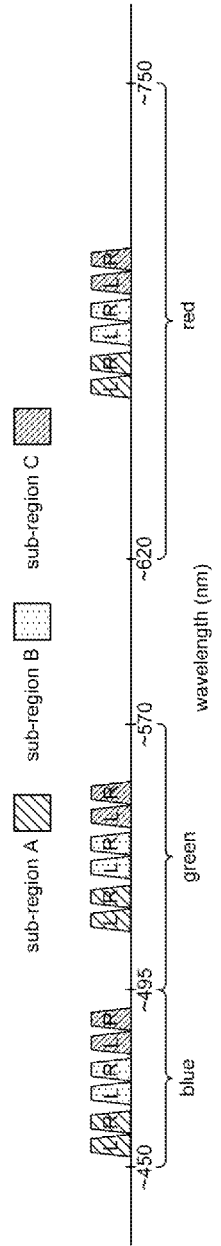
Figure 6
Figure 7

STEREO DISPLAY SYSTEMS

TECHNICAL FIELD

Embodiments of the present invention relate to stereo display technology.

BACKGROUND

Stereopsis is a visual process in which a viewer perceives depth in an image exhibited on a two-dimensional display by presenting the viewer's left-eye viewpoint with a first projection of the image and presenting the viewer's right-eye viewpoint with a second but different projection of the same scene. Stereopsis is processed in the visual cortex in binocular cells having receptive fields in different horizontal positions in the viewer's two eyes. Binocular cells are active only when its preferred stimulus is in the correct position in the left eye and in the correct position in the right eye, making the binocular cells disparity detectors. When a viewer stares at a main object, the viewer's two eyes converge so that the object appears at the center of the retina in both eyes. Other objects around the main object appear shifted in relation to the main object. Because each eye is in a different horizontal position, each eye has a slightly different perspective on a scene yielding different retinal images. When the relative orientations of these two projections are correct, the viewer's brain ideally interprets the visual differences between the images as a single undistorted three-dimensional image.

In recent years, the advent of stereo display technologies enabling viewers to perform stereopsis with two-dimensional displays has been gaining interest and acceptance. With typical stereo display technology, viewers are required to wear eye glasses that control the visual content delivered to each eye. However, it is typically the case that the relative orientations of the projections received by the viewer are correct only for certain viewing locations, such as locations where a viewer's view is orthogonal to the center of a display. By contrast, viewers watching the same display outside these viewing locations experience a re-projection error that manifests as a vertical misalignment of the visual content received by the eyes of the viewers. If the images are very different then in some cases, one image at a time may be seen, a phenomenon known as binocular rivalry. These kinds of visual artifacts are cumulative to most viewers, leading to eye strain, nausea, fatigue, and possibly rejection of the stereo display technology. Thus, mere below threshold objectionableness may not be sufficient for permitting their presence.

Designers and manufacturers of stereo display systems continue to seek improvements that reduce the adverse effects associated with typical stereo display technology.

BRIEF DESCRIPTION OF THE DRAWINGS

FIG. 6 shows an example of a second stereo display system configured in accordance with one or more embodiments of the present invention.
FIG. 7 shows an example of a color filtering scheme for three sub-regions of a stereo display system in accordance with one or more embodiments of the present invention.

DETAILED DESCRIPTION

Various embodiments of the present invention are directed to stereo display systems that rectify and align image pairs projected onto the eyes of the viewers so that each viewer of a display correctly perceives three-dimensional images. In particular, a display viewing area is divided into sub-regions or sub-viewing areas. Stereo display systems of the present invention are configured so that viewers located within each viewing area are presented with image pairs that appear rectified and aligned from their position, enabling the viewers within each viewing area to correctly perceive three-dimensional images presented on a display of the stereo display system.

An Overview of Epipolar Geometry

Readers already familiar with epipolar geometry and other related concepts of stereopsis can skip this subsection and proceed to the next subsection titled Stereo Display System Embodiments. This subsection is intended to provide readers who are unfamiliar with epipolar geometry and stereopsis a basis for understanding relevant terminology and notation, and to provide a basis for understanding various embodiments of the present invention described below.

Figure 1:
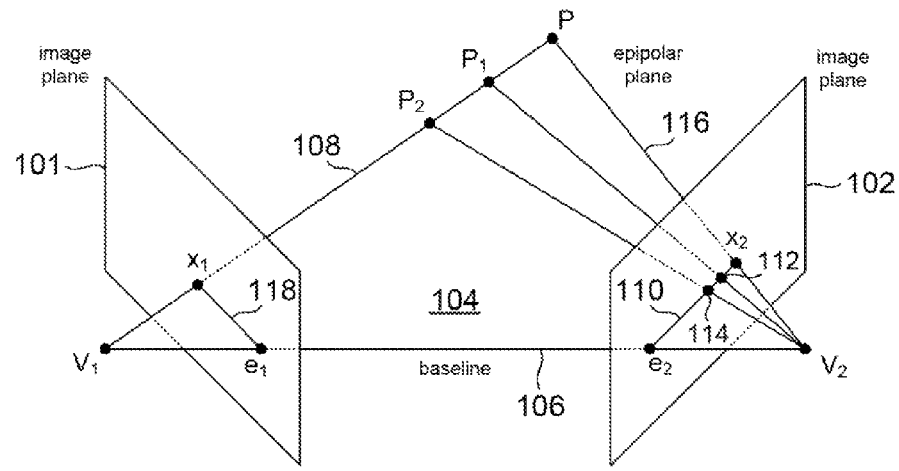
FIG. 1 shows two viewpoints of a single point of interest.

Epipolar geometry characterizes the geometry of stereo vision. In particular, epipolar geometry characterizes the geometric relationships and constraints created when two cameras, or two eyes of a viewer, view a three-dimensional scene from two distinct positions. FIG. 1 shows two viewpoints $V_1$ and $V_2$ of a single point of interest P. FIG. 1 includes a first virtual image plane 101 located between the point P and the viewpoint $V_1$ and a second image plane 102 located between the point P and the viewpoint $V_2$. Image points $x_1$ and $x_2$ are the projections of the point P onto the image planes 101 and 102, respectively. The point P and viewpoints $V_1$ and $V_2$ form a plane 104 called an "epipolar plane." Because the two viewpoints $V_1$ and $V_2$ are distinct, each viewpoint projects onto a distinct point of the other viewpoint's image plane. These two points are represented in FIG. 1 as $e_1$ and $e_2$ and are called "epipoles." In other words, viewpoint $V_1$ projects as the epipole $e_2$ onto the image plane 102, and viewpoint $V_2$ projects as the epipole $e_1$ onto the image plane 101. The viewpoints $V_1$ and $V_2$ and the epipoles $e_1$ and $e_2$ lie on the same line 106 called the "baseline."

As shown in the example of FIG. 1, a line 108 running from $V_1$ to P is seen from the viewpoint $V_1$ as the single image point $x_1$ in the image plane 101. Any points, such as points $P_1$ and $P_2$, that lie along the line 108 are also seen in the image plane 101 as the single image point $x_1$. By contrast, the same line 108 is seen from the viewpoint $V_2$ as a line 110 running from $e_2$ to $x_2$ in the image plane 102 with points $P_1$ and $P_2$ appearing in the image plane 102 as image points 112 and 114, respectively. The line 110 in the image plane 102 is called an "epipolar line." Symmetrically, a line 116 running from $V_2$ to P is seen from the viewpoint $V_2$ as the single image point $x_2$ in the image plane 102 but is seen as an epipolar line 118 running from $e_1$ to $x_1$ in the image plane 101.

When the image point $x_1$ is known, along with the relative geometry between 161 & 102 and $V_1$ and $V_2$, the epipolar line 110 can be determined and the point P projects onto the image point $x_2$ of the image plane 102, which lies on the epipolar line 110. Thus for each point observed in one image plane, the same image point can be observed in the other image plane on a known epipolar line. This provides an "epipolar constraint" which corresponding image points satisfy. Thus, it is possible to test whether two image points really correspond to the same point in three-dimensional space. Epipolar constraints can also be described by a 3×3 fundamental matrix $\overline{F}$ relating the two image points as follows:

$$x_2^T \overline{F} x_1 = 0$$

In other words, when two image points $x_1$ and $x_2$ satisfy the epipolar contraint, then rays defined by the image points $x_1$ and $x_2$ are coplanar.

Figure 2:
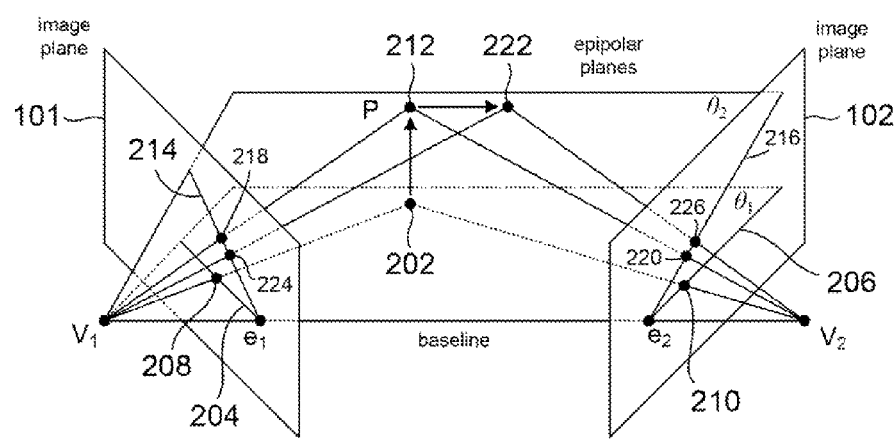
FIG. 2 shows various positions of a point of interest in two different image planes.

All epipolar planes and epipolar lines intersect at the epipoles (i.e., share the same baseline) regardless of where P is located. FIG. 2 shows various positions of the point P in two different image planes. Initially, the point P lies within a first epipolar plane $\theta_1$ at a position 202. The epipolar plane $\theta_1$ intersects the images planes 101 and 102 forming a first pair of epipolar lines 204 and 206. The point P is projected onto the image points 208 and 210 of the epipolar lines 204 and 206, respectively. When the point P is moved, the point P lies within a second epipolar plane $\theta_2$ at a second position. The planes $\theta_1$ and $\theta_2$ share the same baseline. A family of epipolar planes sharing the same baseline is called an "epipolar pencil" or just "pencil." The epipolar plane $\theta_2$ intersects the image planes 101 and 102 forming a second pair of epipolar lines 214 and 216. From the viewpoint $V_1$, the image point 208 moves from the epipolar line 204 to the image point 218 on the epipolar line 214, and from the viewpoint $V_2$, the image point 210 moves vertically from the epipolar line 206 to the image point 220 on the epipolar line 216. On the other hand, when the point P is moved horizontally within the epipolar plane $\theta_2$ to a third position 222, the point P appears to move along the epipolar lines in the respective image planes. In particular, from the viewpoint $V_1$, the image point 218 appears to move laterally along the epipolar line 214 to image point 224. By contrast, from the viewpoint $V_2$, the image point 220 appears to move laterally along the epipolar line 216 to image point 226.

Stereo Image Capture

There are three primary factors to consider in capturing and viewing a three-dimensional video presentation. First, the relative orientations of the cameras, in general, preferentially should be symmetrically configured with either parallel viewing at infinity or toed in with some vergence. Second, the orientation of the display surface with respect to the camera capture and projection ideally should be at right angles to the baseline between the cameras. This leads to epipolar lines on the display surface being parallel and horizontally arranged. Third, the relative orientation of the observer to the display surface as he/she watches the three-dimensional presentation—in the central position of a viewing area, the viewer is looking at right angles to the scene, which is optimal. However, when the viewer is located off center, the viewer could be still viewing at right angles, whereas normal would be to attend to center of the display where most of the action is exhibited.

Figure 3A:
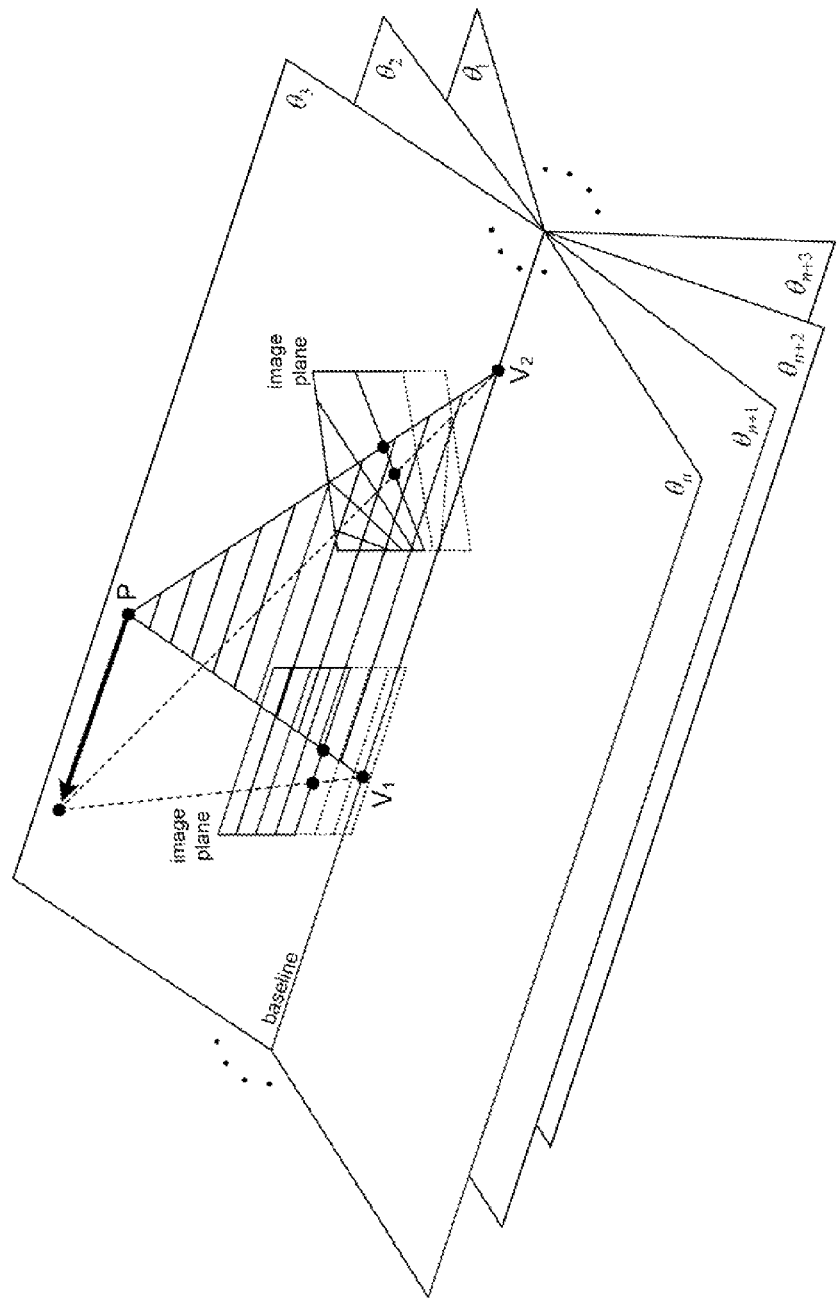
FIGS. 3A-3B show examples of misaligned and aligned epipolar lines of two image planes.

FIG. 3A shows an example of two asymmetrically positioned cameras. In the example of FIG. 3A, viewpoints $V_1$ and $V_2$ represent the centers of projection of the two cameras. Image planes 301 and 302 correspond to the images collected by the first and second cameras. For each point P in a scene and two viewpoints $V_1$ and $V_2$, there is an epipolar plane that passes through P and a baseline 304 joining the viewpoints $V_1$ and $V_2$. The baseline 304 corresponds to a line running through the centers of projection of the cameras. The structure represented in FIG. 3A divides the scene into a pencil of epipolar planes passing through the baseline 304, a number of which are identified as $\theta_1$, $\theta_2$, $\theta_3$, $\theta_n$, $\theta_{n+1}$, $\theta_{n+2}$, and $\theta_{n+3}$. From the viewpoint $V_1$, the image plane 301 is oriented so that the epipolar planes intersect the image planes creating parallel epipolar lines corresponding to each epipolar plane. For example, the epipolar line 306, corresponding to the epipolar plane $\theta_3$ intersecting the image plane 301, and the epipolar dashed line 307, corresponding to the epipolar plane $\theta_2$ intersecting the image plane 301, are parallel. On the other hand, from the viewpoint $V_2$, the image plane 302 is oriented so that the epipolar planes intersect the image plane 302 creating epipolar lines that emanate from a point located on the baseline 304. For example, the epipolar line 308, corresponding to the epipolar plane $\theta_3$ intersecting the image plane 302, and the epipolar dashed line 309, corresponding to the epipolar plane $\theta_2$ intersecting the image plane 302, are not parallel and appear to emanate from the same point.

Figure 3B:
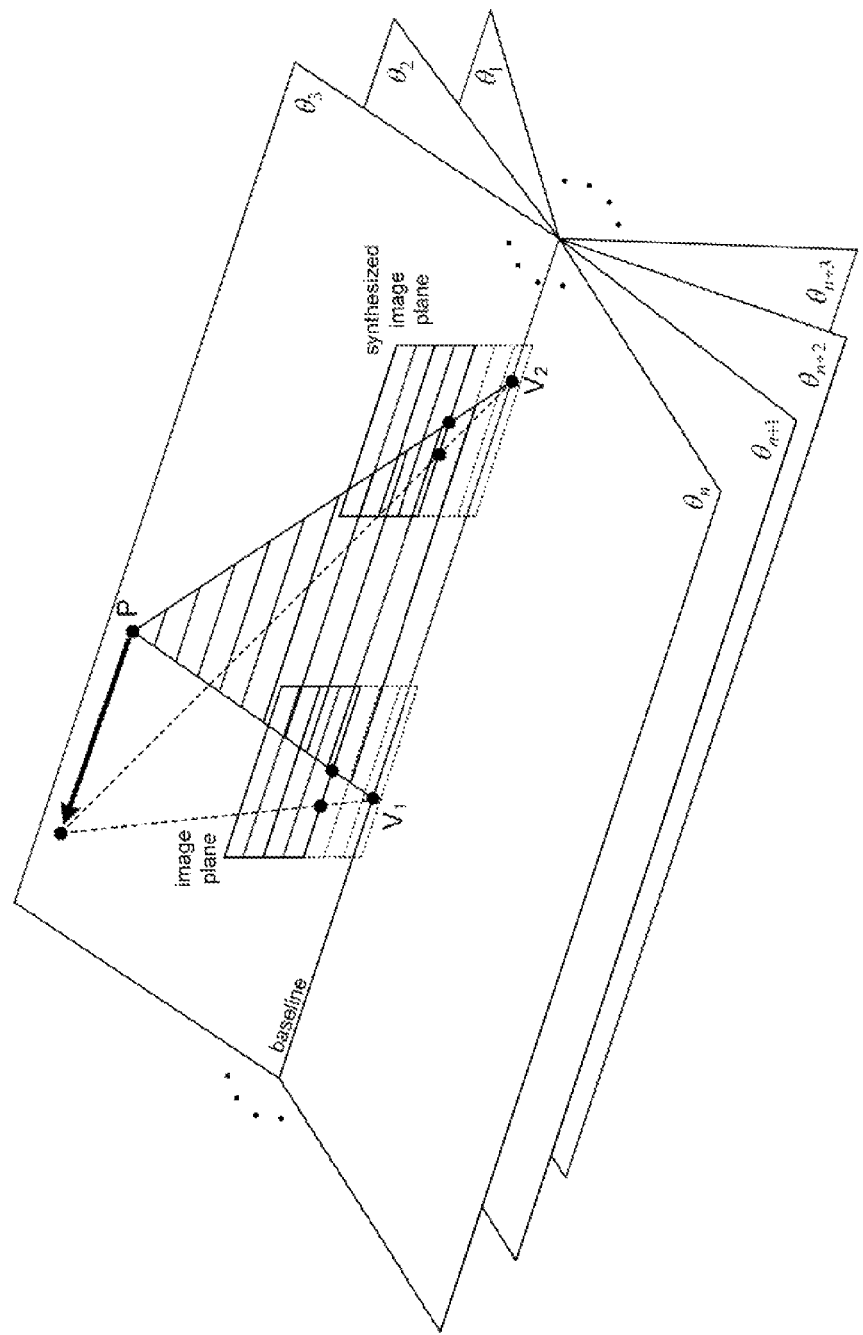

As shown in the example of FIG. 3A, image point 310 corresponds to the point P projected onto the image plane 301, and image point 312 corresponds to the point P projected onto the image plane 302. However, when the images captured by the two cameras of the point P moving in the epipolar plane $\theta_3$ projected on a common display surface, the different orientations of the epipolar lines in the image planes 301 and 302 produce different movements of the points in the image planes. For example, as shown in FIG. 3A, consider moving the point P parallel to the baseline 304 in the epipolar plane $\theta_3$. When the point P moves within the epipolar plane $\theta_3$ from the position 314 to a new position 316, from the viewpoint $V_1$, the image point 310 appears to move horizontally to a new position 318. In other words, the image point 310 moves along epipolar line 306. By contrast, from the viewpoint $V_2$, the point P moves downward to the left to a new position 320. In other words, the image point 312 moves along epipolar line 308, which is not aligned with the movement of the image point observed in the image plane 301. Because of the misalignment between the epipolar lines of the two image planes 301 and 302, if the viewer were to be observing as captured in these images he/she would sees two different types of movements of the point P—and these would be incompatible with good three-dimensional perception. Thus, the viewer over time would likely experience eye strain, fatigue, and nausea. The role of display system embodiments is to ameliorate this situation by bringing these epipolar lines into agreement between the two eyes, as shown in FIG. 3B.

In order to avoid the above described problems, the cameras should be oriented for symmetric capture (i.e., parallel or toed in). A transform called "rectifying homography" that can be used to correct the images produced by the cameras. For example, FIG. 3B shows an example of how rectifying homography can be used to produce a synthesized image plane 322 from image plane 302 of FIG. 3A with the epipolar lines parallel to the epipolar lines of the image plane 301 and parallel to the baseline 304. This image is now structured properly for display. No matter what the relative camera orientations (such as FIG. 3A), there almost always exists a rectifying transformation that delivers this parallel structuring (the exception is when the epipole is actually in the image, in which case the mapping is no longer injective). Movement of the image point 310 along epipolar line 306 in image plane 301 is unchanged, and now in synthesized image plane 322 the point 320 also moves horizontally to a new position 324. Thus, the movements of the point 314 captured by both cameras are consistent because the epipolar lines of the image planes 301 and 322 are in agreement and in agreement with the baseline 304, eliminating eye strain, fatigue, and nausea.

Stereo Display Systems

Figure 4:
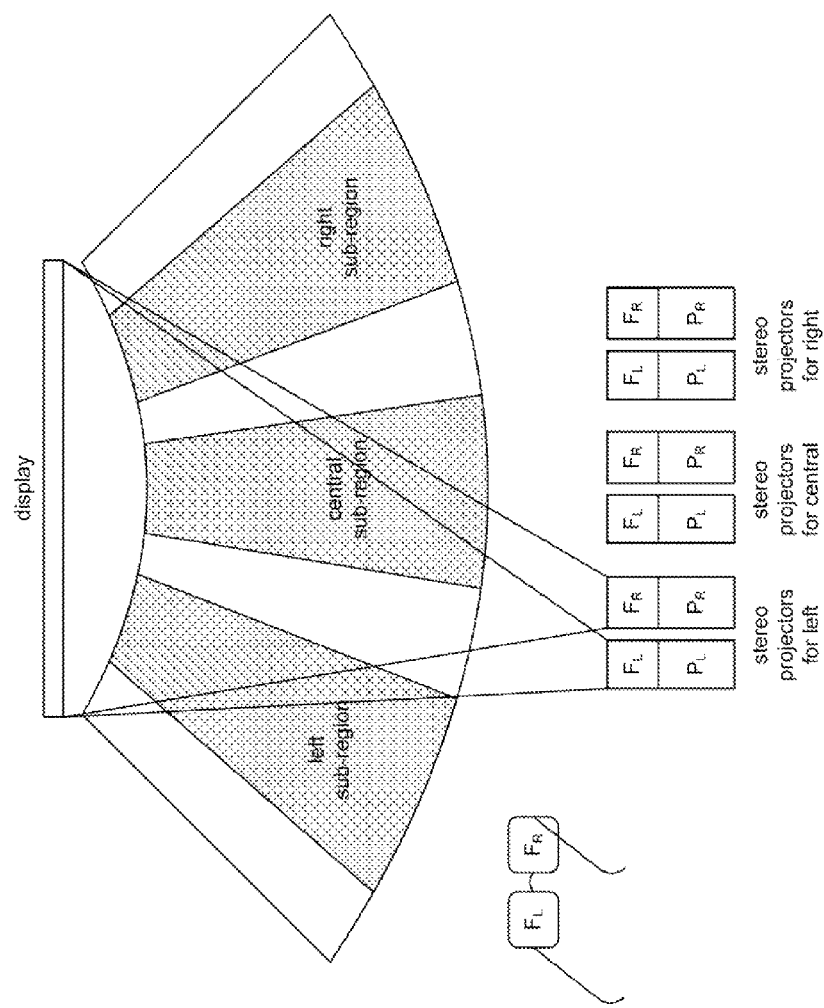
FIG. 4 shows a general schematic representation of a stereo display system configured in accordance with one or more embodiments of the present invention.

For an improved stereo vision experience, embodiments of the present invention are directed to stereo display systems that enable viewers grouped in specific locations of a viewing area to receive separate left-eye and right-eye rectified images for three-dimensional viewing of images projected onto a display. FIG. 4 shows a stereo display system 400 configured in accordance with one or more embodiments of the present invention. The display system 400 includes a display 402, a viewing area 404 divided into sub-regions, such as left, central, and right sub-regions 405-407, and pairs of stereo projectors 409-411, each pair of stereo projectors corresponding to one of the sub-regions. The display 402 can be a white or silvered surface where images can be projected for viewing by viewers located in the viewing area 404. Each pair of stereo projectors includes a left-eye projector, denoted by $P_L$, that projects onto the display 402 an image for the left eye of the viewers grouped in a corresponding sub-region and a right-eye projector, denoted by $P_R$, that projects onto the display 402 an image for the right eye of the viewers grouped in a corresponding sub-region. The separate images produced by a single stereo projector for the left and right-eyes are called "image pairs." For example, as shown in FIG. 4, stereo projectors 409 include a left-eye projector 412 that projects onto the display 402 a left-eye image for viewers grouped in sub-region 405 and a right-eye projector 414 that projects onto the display 402 a right-eye image for the viewers grouped in sub-region 405. Each pair of projectors are configured and oriented so that viewers in corresponding sub-regions of the viewing area 404 receive the horizontal structure shown in FIG. 3B.

Note that stereo display system embodiments of the present invention are not limited to a viewing area sub-divided into just three viewing sub-regions and three corresponding stereo projectors. Display system embodiments can be configured with any suitable number of viewing sub-regions and corresponding stereo projectors in any suitable configuration of the viewing area. However, for simplicity's sake, embodiments of the present invention are described below for stereo display systems with a viewing area sub-divided into only three sub-regions, each sub-region having a corresponding pair of stereo projectors.

The process of capturing and displaying a rectified image pair can be accomplished by determining a set of parameters encapsulated in a camera projection matrix $\overline{C}$, which can be derived from the Fundamental matrix $F$ described above and an epipole. The camera matrix $\overline{C}$ is a mapping of a viewpoint from an actual three-dimensional scene to a point in a two-dimensional image. The camera matrix $\overline{C}$ enables reprojection of an acquired image to match the viewing requirements of the viewers in the various sub-regions of a viewing area. For example, while the baselines between the viewer's eyes and the baseline between the observing cameras are fixed, the orientation of the synthesized projections can be variable. In particular, panning the synthesized image plane enables image pairs with epipolar alignments that are comparable with any viewing attitude. Thus, the camera matrix $\overline{C}$ can be used to resample and rectify the two images captured with stereo cameras to meet the viewing requirements associated with a particular sub-region of a viewing area as follows.

Because the viewers are expected to be looking toward the center of the display and at right angles, the projectors associated with each sub-region are set up to produce substantially the same horizontal structure. The viewers' eyes have a similar scan line structure to a camera, although the viewers create images on the inside of a sphere rather than an image plane as a camera does. To a first approximation, and for the sake of simplicity, the eyes of a viewer can be treated as a plane. This model begins to fail when a viewer is located to the side of center and viewing the display at a non-right angle to the center of screen.

Figure 5A:
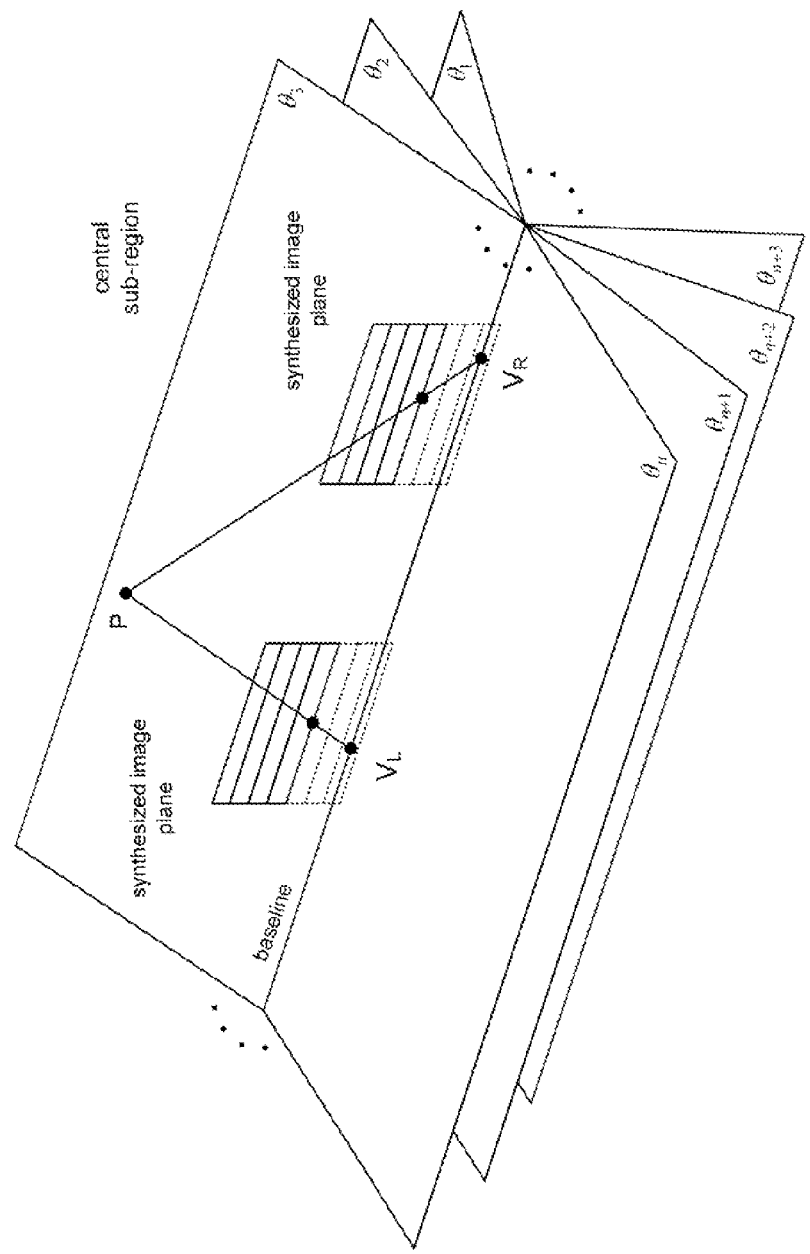
FIGS. 5A-5C show examples of rectified images produced in accordance with one or more embodiments of the present invention.

Returning to FIG. 4, viewers located in the central sub-region 406 look at the display 402 with substantially right angles to the center of the display 402. Each viewer's eye scan lines are oriented in approximately the same manner the surface of the display reflects the captured-and-rectified image scan lines. For each view, the eyeball-to-eyeball baseline is parallel to the screen (e.g., in the camera capture situation described above with reference to FIG. 3B) and there is no vertical disparity or misalignment. FIG. 5 shows examples of synthesized image planes 501 and 502 created for the left and right eyes of the group of viewers located in the central sub-region 406. Viewpoints $V_L$ and $V_P$ represent left-eye and right-eye viewpoints of a viewer's eyes. For a group of viewers located in the central sub-region 406, shown in FIG. 4, the stereo projectors 410 are configured and oriented so that viewers receive a left-eye image and a right-eye image with parallel epipolar lines. The epipolar lines of the image plane 501 for a left-eye viewpoint $V_L$ are parallel, and the epipolar lines of the image plane 502 for a right-eye viewpoint $V_R$ are also parallel. FIG. 5 also reveals that the epipolar lines of image planes 501 and 502 are substantially parallel to a baseline 503 extending between the eyes of the group of viewers.

Figure 5B:
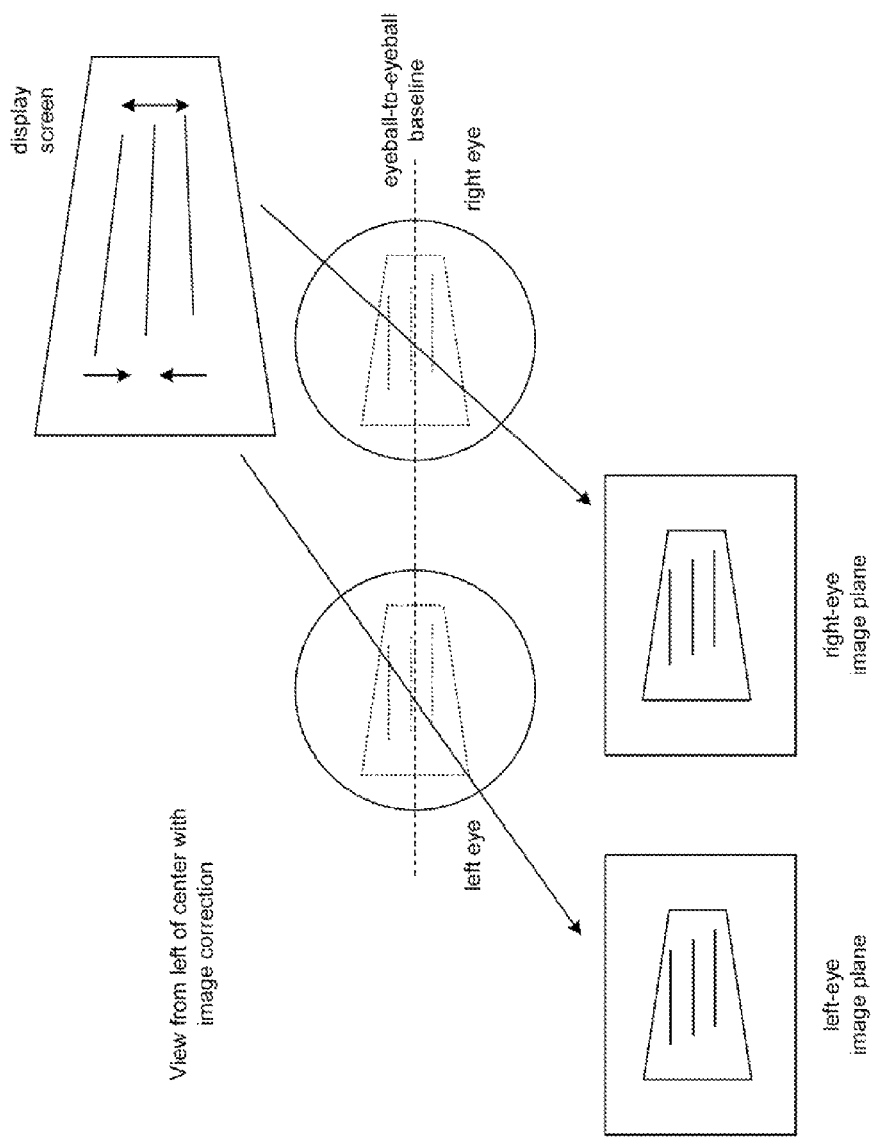

On the other hand, the stereo projectors corresponding to the sub-regions located to the left and right of the central sub-region 406 are configured and oriented to adjust the epipolar lines of image projected onto the display to map to the epipolar lines in each of the eyes of the viewers located in the respective sub-regions. For example, consider a viewer located in the left sub-region 405 and suppose the viewer looks to the right at the center of the display 402 (i.e., the viewer is not viewing the display 402 at right angles). FIG. 5B shows an example view of a viewer located left-of-center in a view area. In the example of FIG. 5B, the viewer sees a display screen 506, through left and right eyeballs represented by circles 507 and 508. Figure 5B also includes left-eye and right-eye image planes 509 and 510 that approximate the actual image regions of the viewer's eyes. Unlike viewers located in the central sub-region, such as sub-region 406, for the viewer located in the left sub-region, the viewer's eyeball-to-eyeball baseline 512 is not parallel to the display screen 506; rather, it intersects the screen. As a result, from the viewer's observation point in the left sub-region, objects exhibited on the display 506 undergo a projective transformation that makes some parts move vertically with respect to his eyeball scan lines. Any parallel lines projected onto the screen appear to converge toward the right side of the display 506. For example, as shown in FIG. 5B, staggered parallel lines 518 appear to converge toward the right side 520 of the display 506. Head and eyeball rotation may ameliorate this effect—where the viewer fixates, there will be no vertical misalignment, but there will be misalignment to the left and right of this position.

Figure 5C:
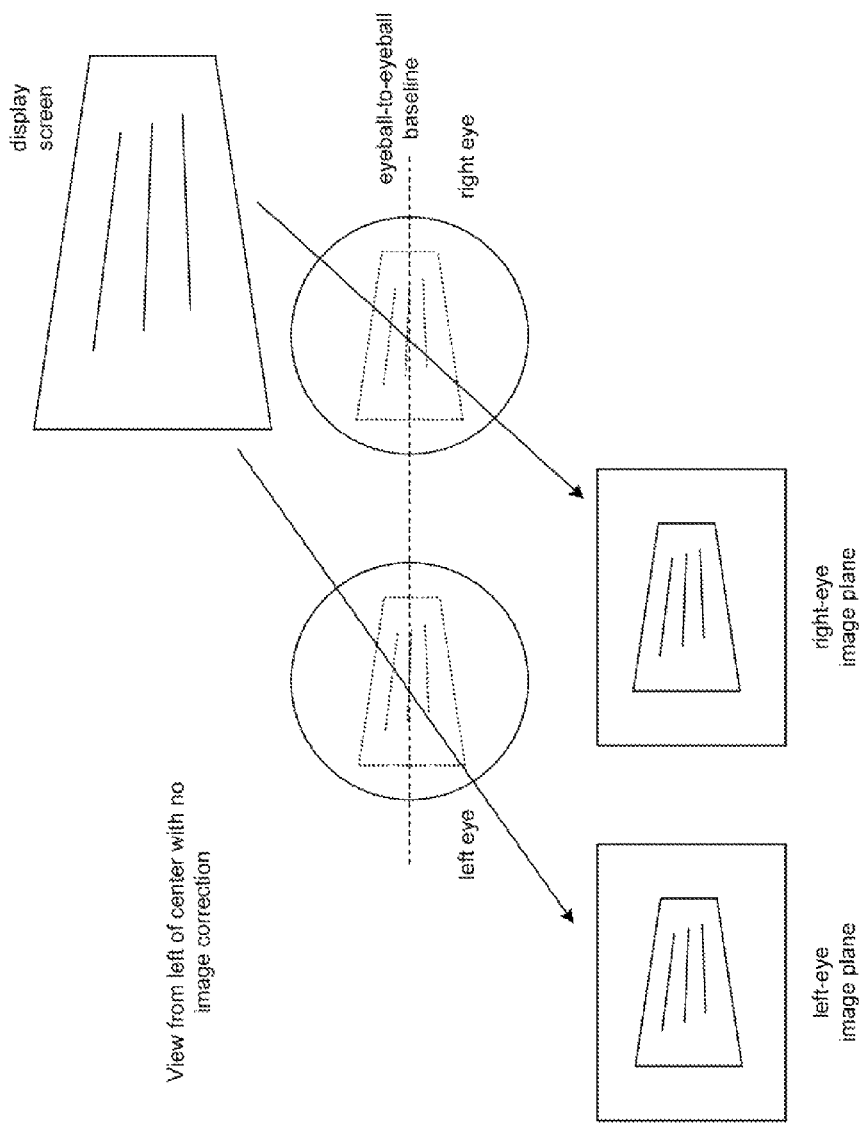

FIG. 5C shows an example view of the same viewer located left-of-center in the view area with image correction performed in accordance with one or more of the embodiments of the present invention. In order to correct for the visual distractions shown in FIG. 5B, as shown in the example of FIG. 5C, the corresponding left-eye and right-eye projectors, such as projectors 409, are configured to stretch the image pair projected onto the display 506 in a vertical direction toward the right side of the display 506, as indicated by directional arrow 522, and shrink the image pairs toward the left side of the display, as indicated by directional arrows 524, so that epipolar lines on the display 506 map to the epipolar lines in each viewer's eyes. In other words, as shown in the example of FIG. 5C, the images captured of the lines 518 by the viewer's eyes 507 and 508 and displayed on the left-eye and right-eye image planes 509 and 510 appear corrected (i.e., parallel), as if the viewer was sitting in the central sub-region of the viewing area.

For a viewer located in the right sub-region 407, the viewer's eyeball-to-eyeball baseline is also not parallel to the screen in manner analogous to the viewer located in the left sub-region 405, as shown in FIG. 5B. From the viewer's observation point in the right sub-region 407, any parallel lines projected onto the screen appear to converge toward the left side of the display 402. As with the viewer located in the left sub-region 405, where the viewer fixates, there will be analogous visual effects; error will occur to the left and right. In order to correct for these visual distractions, analogous the image correction presented in FIG. 5C, the corresponding projectors 411 are configured to stretch the image pair projected onto the display 402 in a vertical direction toward the left side of the display 402 and shrink the image pairs toward the right side of the display so that epipolar lines on the display 402 map to the epipolar lines in each viewer's eyes of the sub-region 407. The images captured by the viewer's eyes also appear corrected, as if the viewer was sitting in the central sub-region of the viewing area.

The projections from display screen to viewers' eyeballs are produced to ameliorate any alignment issues. In other words, the image on the display should be pre-configured so that its epipolar lines best align with the equivalent viewing epipolar structuring of the viewers in that viewing area. This process is approximate, as different viewers will have different orientations. The goal is to minimize, in a general sense, the discomfort, and do this by providing zones within which viewers will have acceptable perceptions.

Returning to FIG. 4, the display system 400 also includes eye glasses 416 worn by viewers. The $e_y e$ glasses are configured with left-eye and right-eye filter lenses corresponding to the left-eye and right-eye filters of one or more of the pairs of stereo projectors. As shown in FIG. 4, the left filter is denoted by $F_L$ and the right filter is denoted by $F_R$. In order for each viewer to experience stereo vision of the images displayed on the display 402, each viewer wears a pair of eye glasses 416 so that the left-eye image produced by a left-eye projector reaches the left eye of the viewer and not the right eye of the viewer, and the right-eye image produced by a right-eye projector reaches the right eye of the viewer and not the left eye of the viewer. For example, when the group of viewers located in the left sub-region 405 are each wearing a pair of glasses 416, the image produced by the left-eye projector 412 enters the left eye of each viewer and the image produced by the right-eye projector 414 enters the right eye of each viewer but not vice versa, ensuring that the group of viewers located in the left sub-region 405 each experience stereo vision.

Embodiments of the present invention ensure that groups of viewers located in one viewing sub-region see exclusively the projections intended for that sub-region and do not also see the projections intended for the other sub-regions. For example, if the group of viewers located in the central sub-region 406 were also able to see the projections intended for the group of viewers located in the left sub-region 405, the group of viewers in the central sub-region would see correctly rectified image pairs produced by the stereo projectors 410, but they would also see the image pairs produced by the stereo projectors 409. The images intended for viewers located in the left sub-region would appear distorted to the viewers located in the central sub-region, resulting in confusion, visual distractions and possibly other unpleasant side effects including eye strain, fatigue, and nausea.

FIG. 6 shows an example of a stereo display system 600 configured in accordance with one or more embodiments of the present invention. The display system 600 includes a display 602, a viewing area 604 divided into viewing sub-regions A, B, and C, and corresponding stereo projectors A, B, and C. The display 602 can be a white or silvered surface where images can be projected for viewing by viewers in the viewing area 604. In this embodiment, the stereo projectors A, B, and C can be placed in one location. Each pair of stereo projectors is configured to project rectified left-eye and right-eye images comprising an image pair for the groups of viewers located in a corresponding viewing sub-region, as described above. For example, stereo projectors $P_{AL}$ and $P_{AR}$ project rectified left-eye and right-eye images onto the display 602 for the group of viewers located in sub-region A. As shown in the example of FIG. 6, each pair of stereo projectors also includes left-eye and right-eye filters that correspond to a particular sub-region. For example, left-eye projector $P_{AL}$ includes a left-eye filter $F_{AL}$ and right-eye projector $P_{AR}$ includes a right-eye filter $F_{AR}$. In this embodiment, each viewer located in a viewing sub-region also wears a pair of eye glasses with left-eye and right-eye lens filters that correspond to the left-eye and right-eye filters of the stereo projectors, forming a filter system associated with each sub-region. For example, the group of viewers located in sub-region A each wear a pair of eye glasses A configured with a left-eye filter lens $F_{AL}$ that matches the left-eye filter $F_{AL}$ of the left-eye projector $P_{AL}$, and is configured with a right-eye filter lens $F_{AR}$ that matches the right-eye filter $F_{AR}$ of the right-eye projector $P_{AR}$. The corresponding left-eye and right-eye filters of the eye glasses and the stereo projectors ensure that the image pairs produced by the stereo projectors reach the left and right eyes of the viewers in the corresponding sub-region and cannot also be seen by viewers located in the other sub-regions. For example, left-eye filter $F_{BL}$ of left-eye projector $P_{BL}$ and left-eye filter lens $F_{BL}$ of a pair of eye glasses B ensure that the left-eye image projected onto the display 602 by the left-eye projector $P_{BL}$ can be viewed in the left eye of the viewers located in sub-region B. The remaining filters prevent the left-eye image projected by the left-eye projector $P_{BL}$ from being viewed.

The eye glasses associated with each sub-region can be marked so that viewers choosing to view the display 602 from a particular sub-region select the appropriate pair glasses associated with the sub-region. For example, color coding can be used to match eye glasses to a particular sub-region of a viewing area.

In certain embodiments, in order to ensure that a group of viewers located in a particular sub-region can exclusively view the image pairs intended for that sub-region, each sub-region can have a different pair of associated shutter glasses. The shutter glasses are used to create the illusion of a three-dimensional image by synchronizing left-eye and right-eye lens transparency and darkness with the images projected by the corresponding left-eye and right-eye projectors. In particular, each lens of a pair of shutter glasses includes a liquid crystal layer with polarizing filters with the property that the lens becomes dark when an appropriate voltage is applied, but the lens is otherwise transparent. Shutter glasses are operated by alternating between dark over the right eye and transparent over the left eye, and then are abruptly switched with transparent over the right eye and dark over left eye. The switching between transparent over one eye and dark over the other eye is synchronized with the refresh rate of the pair of corresponding projectors. For example, while the right eye is transparent the corresponding right-eye projector projects the image for the right eye onto the display 602, the left eye is dark, and the left-eye projector is not projecting. The lenses are switched so that while the left eye is transparent the corresponding left-eye projector projects the image for the left eye onto the display 602 and the right eye is dark and the right-eye projector is not projecting. Of course, view integration time and brightness levels must be selected to ensure a continuous—flicker-free—reception, which impacts shutter frequency and dwell.

In other embodiments, each sub-region can have a different pair of associated eye glasses configured with polarized left-eye and right-eye filters. For example, the left-eye and right-eye filters $F_{AL}$ and $F_{AR}$ of the eye glasses A and the stereo projectors A can be configured to transmit left circularly polarized light and right-circularly polarized light, respectively; the left-eye and right-eye filters $F_{BL}$ and $F_{BR}$ of the eye glasses B and the stereo projectors B can be configured to transmit horizontally polarized light and vertically polarized light, respectively; and the left-eye and right-eye filters $F_{CL}$ and $F_{CR}$ of the eye glasses C and the stereo projectors C can be configured to transmit 45° polarized light and −45° polarized light, respectively. In other embodiments, different combinations of polarized filters can be used and filters with other polarization angles can be used, although the linear combination of two phase shifts for polarization do not lend themselves, when used alone, to more than two discretizations.

In other embodiments, in order to ensure that a group of viewers located in a particular sub-region can exclusively view the image pairs intended for that sub-region, each sub-region can have a different pair of associated left-eye and right-eye color filters. FIG. 7 shows an example of a color filtering scheme for the three sub-regions A, B, and C in accordance with one or more embodiments of the present invention. In the example of FIG. 7, a portion 700 of the visible electromagnetic spectrum is shown with the primary color regions identified as red, green, and blue. Blue colored light has wavelengths ranging from about 450 nm to about 495 nm, green colored light has wavelengths ranging from about 495 nm to about 570 nm, and red colored light has wavelengths ranging from about 620 to about 750 nm. Appropriate intensities of blue, green and red light can be used to produce a useful range of colors. The left-eye and right-eye filters selected for each sub-region can be configured to transmit wavelengths within different segments of the red, green, and blue portions of the visible spectrum, in order to ensure that a group of viewers located in a particular sub-region can exclusively view the image pairs intended for that sub-region in color. FIG. 7 includes a legend 702 of patterns that can be used to identify segments of the visible spectrum corresponding to the left-eye and right-eye filters of the sub-regions A, B, and C. For example, as shown in FIG. 7, the left-eye filters $F_{AL}$ of eye glasses A and stereo projector $P_{AL}$ pass segments 704-706 corresponding to a first set of blue, green, and red wavelength ranges of the visible spectrum, and the right-eye filters $F_{AR}$ of eye glasses A and stereo proctor $P_{AR}$ pass segments 707-709 corresponding to a second set of blue, green, and red wavelength ranges of the visible spectrum. The first and second sets of blue, green, and red wavelength ranges ensure that the left eye of each viewer in the sub-region A sees a color projection of the projector $P_{AL}$ and not the projection of the projector $P_{AR}$, and that the right eye of each viewer in the sub-region A sees the color projection of the projector $P_{AR}$, and not the projection of the projector $P_{AL}$. Consider now the left-eye filters $F_{CL}$ of eye glasses C and stereo projectors $P_{CL}$ pass segments 710-712 corresponding to a third set of blue, green, and red wavelength ranges of the visible spectrum, and right-eye filters $F_{CR}$ of eye glasses C and stereo projector $P_{CR}$ pass segments 713-715 corresponding to a fourth set of blue, green, and red wavelength ranges of the visible spectrum. The third and fourth sets are different from the first and second sets ensuring that viewers in sub-region A cannot see the image pairs projected in sub-region C and vice versa.

Figure 8:
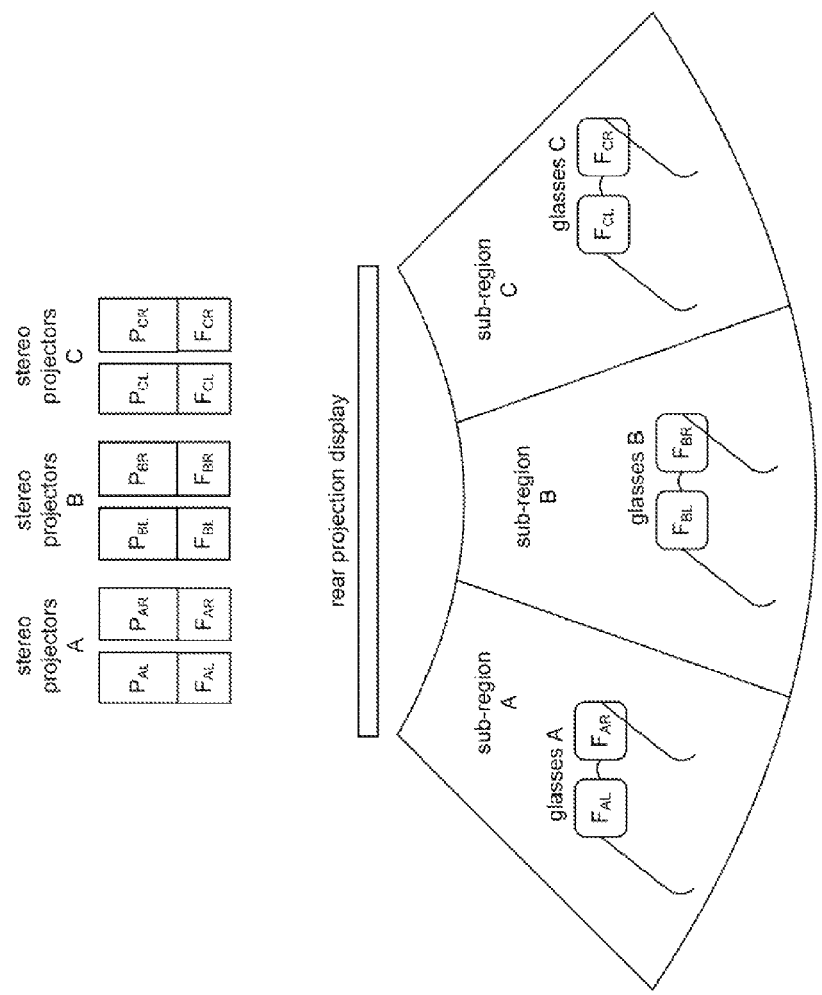
FIG. 8 shows an example of a third stereo display system configured in accordance with one or more embodiments of the present invention.

Note that embodiments of the present invention are not limited to projecting onto the display 602 from behind the viewing area 604, as in a typical theater setting. In other embodiments, the stereo projectors can be located anywhere above the viewing area and projected onto the display 602. In still other embodiments, the stereo projectors can be located in front of the viewing area 604 and behind the display 602. FIG. 8 shows an example of a stereo display system 800 configured in accordance with one or more embodiments of the present invention. The display system 800 is nearly identical to the display system 600 described above, except a display 802 is located between the stereo projectors A, B, and C and the viewing area 604. The eye glass filters and filters associated with the stereo projectors are configured and operated in the same manner as the filters described above with reference to the stereo display system 600.

Figure 9:
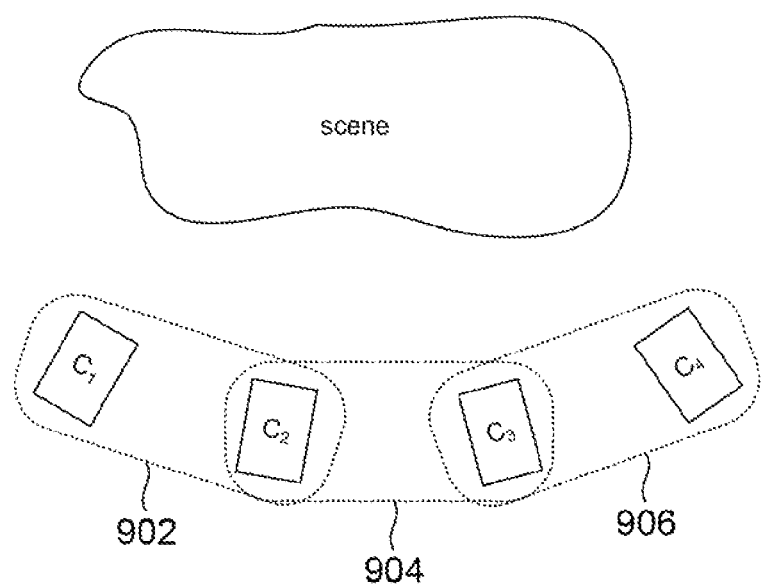
FIG. 9 shows an example of four cameras used to create three viewzones of a scene in accordance with one or more embodiments of the present invention.

Combinations of such filtering and shuttering mechanism may be employed together to provide a combinatorial selection of image view zones. For example, there may be shuttering at 4 frequencies (2 view zones), each using color filtering of 12 bands (4 sets of 3-band RGB filters, again 2 view zones), and thus supporting four viewing sub-regions within the viewing area Embodiments of the present invention also include providing other viewpoints that both deliver projectively aligned epipolar lines and match the perceived orientation from the viewer's perspective in a viewing environment. This may be accomplished with n+1 cameras for n stereo view zones, where adjacent cameras provide the different viewpairs that can be rectified and resampled independently of the other pairs to match their intended viewing orientations. FIG. 9 shows an example of four cameras used to create three viewzones of a scene in accordance with one or more embodiments of the present invention. As shown in the example of FIG. 9, adjacent cameras $C_1$ and $C_2$ form a first stereo viewzone 902, adjacent cameras $C_2$ and $C_3$ form a second stereo viewzone 904, and adjacent cameras $C_3$ and $C_4$ form a third stereo viewzone 906. The pair of cameras in each stereo viewzone can be configured and oriented to capture either parallel viewing at infinity or toed in viewing with a vergence to focus on, as described above with reference to FIG. 3A. The pair of images captured by the cameras $C_1$ and $C_2$ can be rectified and resampled to produce the left-eye and right-eye images projected by the stereo projectors $P_{AL}$ and $P_{AR}$ described above; the pair of images captured by the cameras $C_2$ and $C_3$ can be rectified and resampled to produce the left-eye and right-eye images projected by the stereo projectors $P_{BL}$ and $P_{BR}$ described above; and the pair of images captured by the cameras $C_3$ and $C_4$ can be rectified and resampled to produce the left-eye and right-eye images projected by the stereo projectors $P_{CL}$ and $P_{CR}$ described above.

Figure 10:
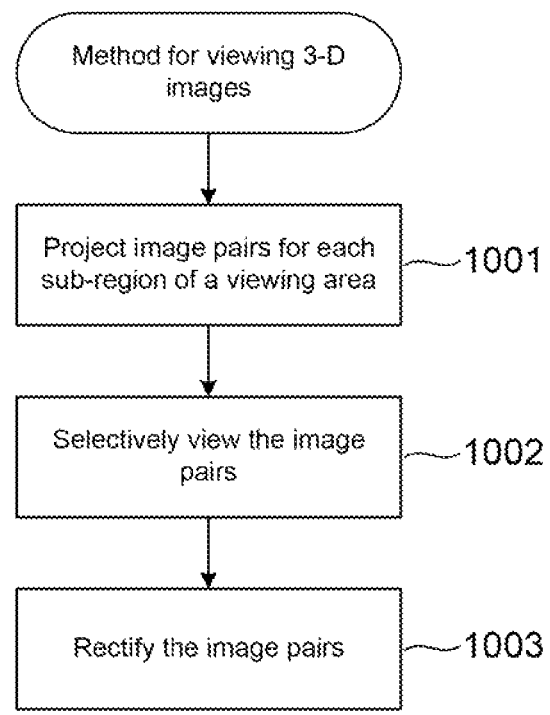
FIG. 10 shows a control-flow diagram of a method for viewing three-dimensional image in accordance with one or more embodiments of the present invention.

FIG. 10 shows a control-flow diagram of a method for viewing three-dimensional image in accordance with one or more embodiments of the present invention. Note the following steps are not limited to the order shown in FIG. 10 and now described. In step 1001, image pairs are projected onto a display from a corresponding pair of projectors, as described above with reference to FIGS. 4, 6, and 8. In step 1002, image pairs are selectively viewed in sub-regions of a viewing area, as described above with reference to FIGS. 4, 6, 7, and 8. In step 1003, image pairs are rectified to produce three-dimensional images that can be viewed exclusively in the sub-regions, as described above with reference to FIGS. 4 and 5.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A stereo display system comprising:
    a display;
    a viewing area divided into a plurality of sub-regions; and
    multiple pairs of stereo projectors;
    wherein each pair of stereo projectors of the multiple pairs of stereo projectors is assigned to provide projection for only a corresponding sub-region of the plurality of sub-regions of the viewing area by projecting a corresponding image pair onto the display that is substantially rectified for viewers located only in the corresponding sub-region, so that only those viewers perceive three-dimensional images projected by that pair of stereo projectors on the display.

2. The system of claim 1 wherein each pair of stereo projectors assigned to provide projection to a corresponding sub-region further comprises:
    a left-eye projector configured to project an image of the image pair that appears substantially rectified to the left eye of the one or more viewers located in the corresponding sub-region; and
    a right-eye projector configured to project an image of the image pair that appears substantially rectified to the right eye of the one or more viewers located in the corresponding sub-region.

3. The system of claim 1 further comprises one or more filter systems, wherein each filter system is associated with a sub-region from the plurality of sub-regions of the viewing area and an assigned pair of stereo projectors, each filter system configured so that viewers in the associated sub-region see the image pairs projected onto the display by the assigned stereo projectors and not the image pairs projected onto the display by a different pair of stereo projectors.

4. The system of claim 3 wherein each filter system further comprises:
    eye glasses configured with a left-eye filter and a right-eye filter worn by viewers in the associated sub-region; and
    a left-eye filter and a right-eye filter placed on left-eye and right-eye projectors of the stereo projectors assigned to provide projection for the associated sub-region, wherein for each viewer in the associated sub-region, the left-eye filters are configured to ensure a left-eye image projected by the left-eye projector onto the display is seen exclusively by the left eye of the viewers, and the right-eye filters are configured to ensure a right-eye image projected onto the display by the right-eye projector is seen exclusively by the right eye of the viewers.

5. The system of claim 3 wherein each filter system further comprises:
    a first type of color filter configured to selectively pass a first set of selected segments of blue, green, and red wavelength ranges of the visible portion of the electromagnetic spectrum; and
    a second type of color filter configured to selectively pass a second set of selected segments of blue, green, and red wavelength ranges of the visible portion of the electromagnetic spectrum.

6. The system of claim 3 wherein each filter system further comprises:
    a first type of polarization filter configured to selectively pass light in a first polarization state; and
    a second type of polarization filter configured to selectively pass light in a second polarization state.

7. The system of claim 3 wherein each filter system further comprises shutter glasses worn by the viewers in an associated sub-region such that for each sub-region of the plurality of sub-regions of the viewing area, alternating left-eye and right-eye lens transparency and darkness of the shutter glasses worn by the viewers in the viewing area are synchronized with the refresh rate of the assigned pair of stereo projectors.

8. The system of claim 3 wherein each filter system further comprises a combination of shutter glasses and color and/or polarization filters that provide a combinatorial selection for each of the sub-regions.

9. The system of claim 1 wherein the pair of stereo projectors assigned to provide projection for a central sub-region of the plurality of sub-regions of the viewing area are configured and oriented so that a group of viewers located in the central sub-region receive a left-eye image and a right-eye image with parallel epipolar lines that are also substantially parallel to scan lines of images projected onto the display.

10. The system of claim 1 wherein the pair of stereo projectors assigned to provide projection for a first sub-region of the plurality of sub-regions of the viewing area located on a first side of the display are configured and oriented to show image pairs projected onto the display in a manner that makes them appear substantially properly structured for epipolar-aligned viewing in the first sub-region, and the pair of stereo projectors assigned to provide projection for a second sub-region of the plurality of sub-regions of the viewing area located on a second side opposite the first side are configured and oriented to show image pairs projected onto the display in a manner that makes them appear substantially properly structured for epipolar-aligned viewing in the second sub-region.

11. The system of claim 1 wherein the display further comprises a white or silvered surface and the multiple pairs of stereo projectors are centrally located so that the image pairs are projected onto the display from behind or above the viewing area.

12. The system of claim 1 wherein the display further comprises a rear projection display screen and the multiple pairs of stereo projectors are located in front of the viewing area and behind the display so that image pairs are projected onto the display facing viewers located in the viewing area.

13. The system of claim 1 wherein the image pairs projected by each pair of stereo projectors are created by n+1 cameras for n stereo view zones, wherein paired cameras provide different view pairs that are rectified and resampled independently of other camera pairs.

14. A method for viewing three-dimensional images comprising:
   dividing a viewing area of a display into a plurality of sub-regions;
   projecting multiple image pairs onto the display, each image pair of the multiple image pairs generated by a pair of stereo projectors assigned to provide projection for a corresponding sub-region of the viewing area;
   selectively viewing each image pair in the corresponding sub-region of the viewing area, wherein one or more viewers located only in the corresponding sub-region exclusively view only the image pair generated by the pair of stereo projectors assigned to provide projection for the corresponding sub-region of the viewing area; and
   rectifying each of the multiple image pairs, wherein the one or more viewers perceive the three-dimensional images presented on the display from the corresponding sub-region of the viewing area.

15. The method of claim 14 wherein projecting the multiple image pairs further comprises:
   projecting an image of the image pair that appears substantially rectified to the left eye of the one or more viewers located in the corresponding sub-region using a left-eye projector; and
   projecting an image of the image pair that appears substantially rectified to the right eye of the one or more viewers located in the corresponding sub-region using a right-eye projector.

* * * * *